United States Patent [19]

Dev Choudhury

[11] 4,121,048

[45] Oct. 17, 1978

[54] MULTIPLE SHIFT ELECTRONIC KEYBOARD

[75] Inventor: Rathindra N. Dev Choudhury, Ithaca, N.Y.

[73] Assignee: NCR Corporation, Dayton, Ohio

[21] Appl. No.: 819,788

[22] Filed: Jul. 28, 1977

[51] Int. Cl.[2] ........................ B41J 25/24; H04L 15/06

[52] U.S. Cl. .................................... 178/17 C; 178/81; 340/365 S; 400/253

[58] Field of Search ........................ 340/365 R, 365 S; 178/17 C, 79, 80, 81; 197/71

[56] References Cited

U.S. PATENT DOCUMENTS 3,846,758 11/1974 Gosset .................................. 197/71

FOREIGN PATENT DOCUMENTS 2,231,998 1/1973 Fed. Rep. of Germany ....... 340/365 S

*Primary Examiner*—Thomas A. Robinson
*Attorney, Agent, or Firm*—J. T. Cavender; Wilbert Hawk, Jr.; Richard W. Lavin

[57] ABSTRACT

A full-roll electronic keyboard having upper and lower case capabilities is disclosed. The keyboard includes a shift key which when depressed will generate first and second coded signals with the first signal utilized to indicate the start of a shift operation. Upon release of the shift key, the first and second coded signals are again generated with the first signal again being used to indicate the end of a shift operation. The first coded signals generated by the movement of the shift key informs a processing unit that any character key on the keyboard depressed between the generation of the two first coded signals will be shifted from the lower to the upper case. The shift key circuit includes an inverter which is utilized in the generation of the first and second coded signals upon the operation of the shift key.

14 Claims, 8 Drawing Figures

MULTIPLE SHIFT ELECTRONIC KEYBOARD

BACKGROUND OF THE INVENTION

The present invention is directed to a full-roll electronic keyboard system in which an electronic keyboard is connected to an encoder which outputs a multibit code such as the well known 7 bit code such as the well known 7 bit ASCII code for each key actuation, and more particularly, to a keyboard circuit for increasing the number of shift keys that are available on a keyboard.

Present electronic keyboards are normally constructed with a predetermined number of shift keys for use in shifting the coded output of associated control keys between the upper and lower case. It has been found that in some business situations, it would be desirable to increase the number of shift keys on the keyboard so as to provide more flexibility in its operation and to better meet the needs of its application. Prior electronic keyboards with shift key capabilities have been constructed in a manner which prevents the addition of shift keys to the keyboard without requiring a new keyboard. Examples of this type of keyboard are found in U.S. Pat. Nos. 3,569,991 and 3,623,588, in which operation of the shift key changes individual code bits of the character key depressed thereby selecting one of two characters represented by the character key depressed. It is therefore a principal object of this invention to provide a circuit for use in wiring a key in a full rollover keyboard for increasing the number of shift keys in the keyboard. It is a further object of this invention to provide circuitry for an electronic keyboard for increasing the number of shift keys on the keyboard without modifying the key structure of the keyboard.

SUMMARY OF THE INVENTION

In order to fulfill these objects, there is provided a full rollover keyboard which includes a keyboard switch matrix coupled to a keyboard encoder unit for receiving signals from the switch matrix upon depression of a key on the keyboard for decoding the signal and transmitting the data to a processing unit. A shift key circuit is provided which outputs a pair of different level control signals to the keyboard encoder upon each depression and release of the shift key wherein the two control signals of the same level are utilized by the encoder to output to a processing unit two different coded signals for use by the processing unit in shifting any key on the keyboard depressed between the depression and release of the shift key.

BRIEF DESCRIPTION OF THE DRAWING

One embodiment of the invention will now be described, by way of example, with reference to the accompanying drawing, in which.

DESCRIPTION OF THE PREFERRED EMBODIMENT

Figure 1:
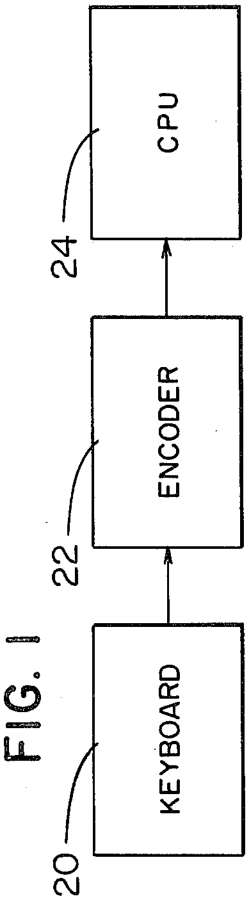
FIG. 1 is a simplified schematic block diagram of the keyboard encoding system including a keyboard encoder and a processing unit.

Referring to FIG. 1, there is shown in block form the keyboard encoding system in which the present invention is embodied. The system includes a keyboard 20 having a key switch diode matrix construction, and a keyboard encoder 22 for receiving signals from the keyboard 20 representing the depression of a key member on the keyboard for outputting data in the form of a multi-bit code representing the depressed key member to a processing unit 24 which processes the data in accordance with the application of the keyboard system. The present invention employs the 7 bit U.S.A. Standard Code for Information Interchange (ASCII) for representing the depressed key. Other multi-bit codes are of course possible. The keyboard encoder 22 is capable of N key rollover where N is any integer. A roll is defined, for the purposes of this invention, as the ability to accept and encode the signals of a depressed key member even if one or more previously depressed key members have not been released at the time of the depression of the last key member. An example of such an encoder may be found in U.S. Pat. No. 3,675,239 which has been assigned to the assignee of the present application.

Figure 2:
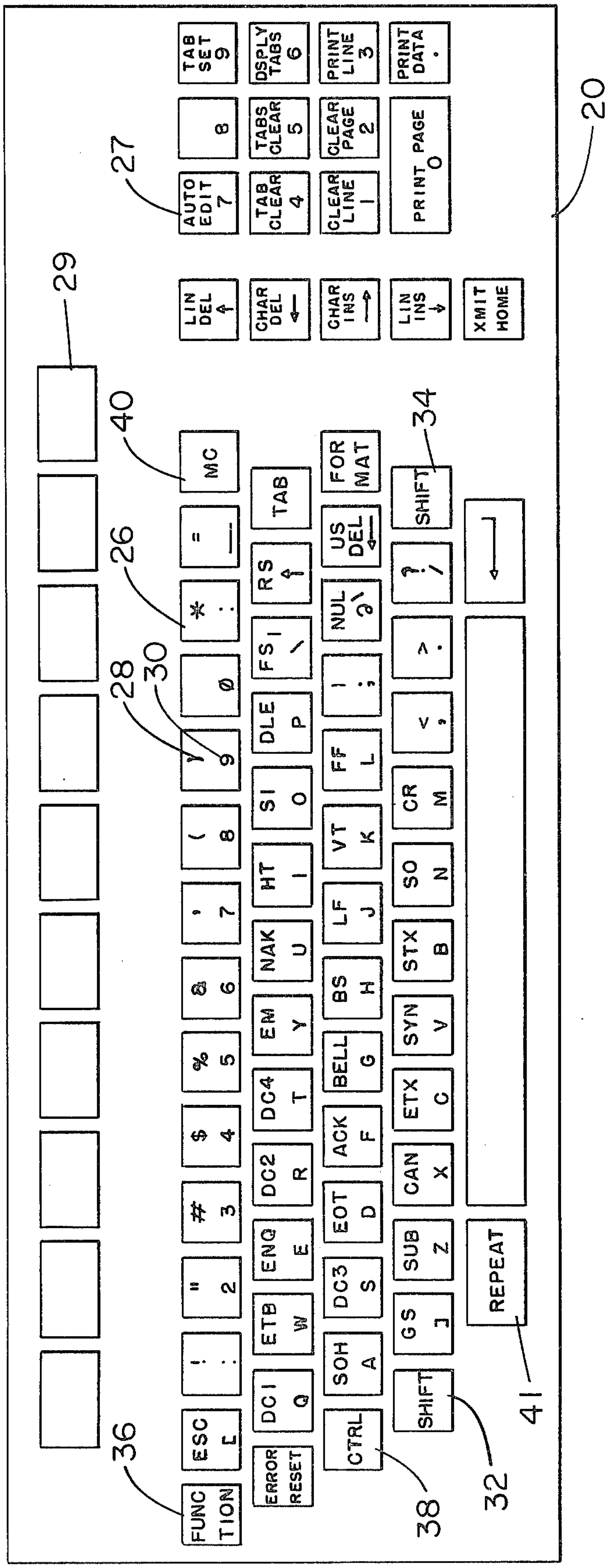
FIG. 2 is a plan view of the keyboard used in the present embodiment.

Referring now to FIG. 2, there is shown a plan view of the keyboard 20 of the present embodiment. Included in the keyboard 20 are a plurality of well-known alphanumeric control key members 26 having upper 28 and lower 30 case indicia representing either the character to be printed or other data which is to be used in the business transaction in which the system is employed. The keyboard 20 further includes a plurality of operating keys 27 and a row of customer programmable keys 29. Normally the keyboard includes two shift keys 32, 34 for use in notifying the processing unit 24 to shift the data of a depressed control key 26 from the lower case to the upper case, the shift key 32 being depressed for signalling the start of a shift operation while the shift key 34 is depressed for signalling the end of a shift operation. Because of business requirements, it has been found that it would be desirable to have further shift modes as indicated in FIG. 2 by the control keys 26 identified as function 36, control 38, multiple code 40 and repeat 41. The present invention allows and of the control keys 26 on the keyboard to function as a shift key.

Figure 3:
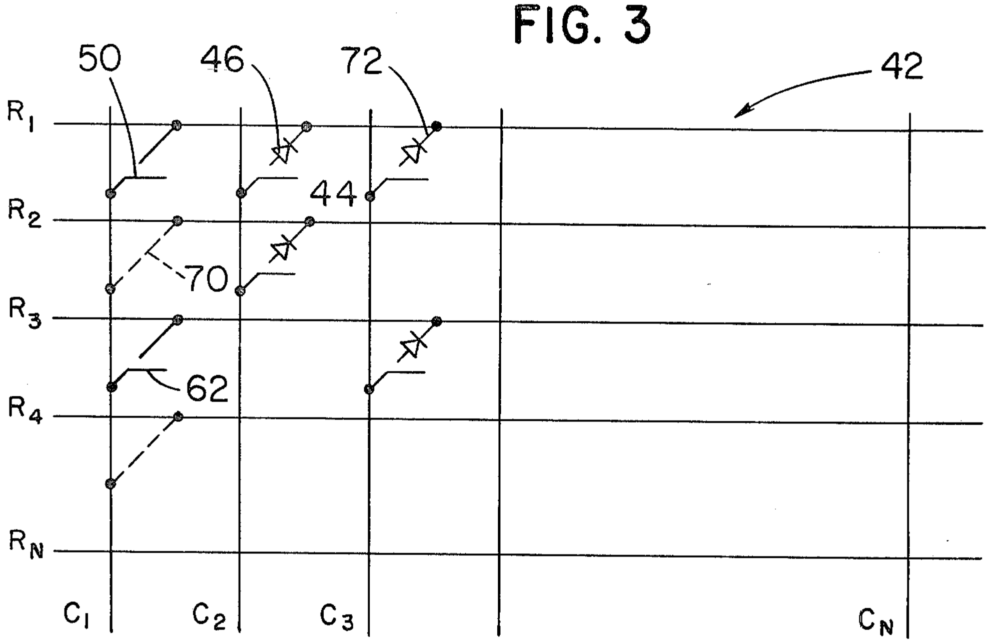
FIG. 3 is a representation of a portion of the switch matrix illustrating the present invention.
Figure 4:
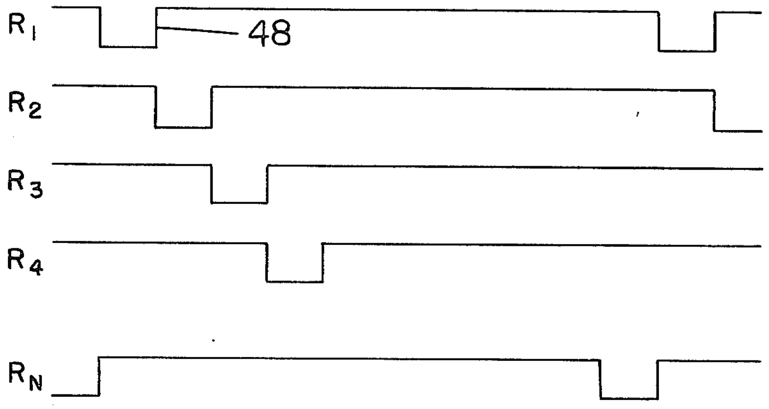
FIG. 4 is a timing diagram of the strobe pulses which are applied to the switch matrix.

Referring now to FIG. 3, there is shown a schematic diagram of a switch matrix unit generally indicated by the numeral 42 that may be utilized in the keyboard 20 for outputting a signal representing the depression of any control key 26 designated as a shift key in the keyboard 20. This matrix unit includes a plurality of input row conductors $R_n$-$R_n$ inclusive and a plurality of output column conductors $C_1$-$C_n$ inclusive. As is well known in the art, such row and column conductors are interconnected by a circuit including a switch contact 44, associated with a key member on the keyboard 20 and closed upon the depression of the associated key member, and a diode 46. The diodes 46 (FIG. 3) are provided to eliminate any false key signal which may occur when more than two of such shift keys are depressed simultaneously. Each row conductor $R_1$-$R_n$ is successively scanned by a strobe pulse 48 (FIG. 4) in a manner that is well-known in the art. If any shift designated key 26 has been depressed at the time of the generation of a scanning strobe pulse 48, the column conductor coupled through the closed switch contact 44 to the scanned row conductor will be energized by the strobe pulse, which pulse will be transmitted over the column conductor to the keyboard encoder 22 which generates the proper multi-bit code representing the key depressed. As shown in FIG. 4, the strobe pulses 48 utilized in this embodiment are negative true pulses although it is obvious that positive true pulses can be utilized. It is further obvious that column conductors $C_1$-$C_n$ inclusive can be scanned by the strobe pulses with the row conductors $R_1$-$R_n$ inclusive being sensed to determine the shift designated key member 26 depressed.

Figure 5A:
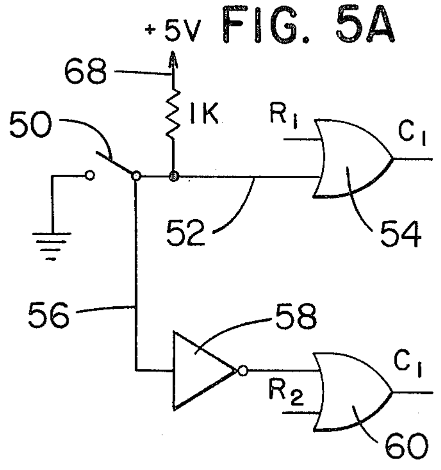
FIGS. 5A and 5B together show the circuit for two of the shift keys located on the keyboard.
Figure 5B:
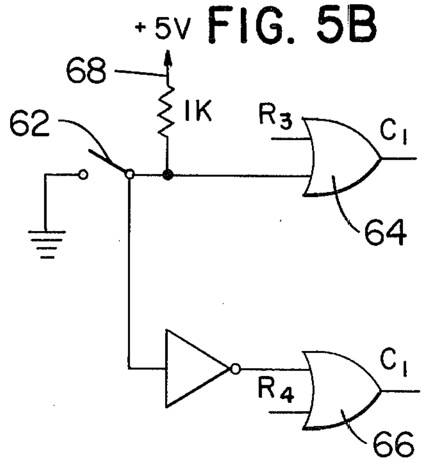

Referring now to FIGS. 5A and 5B, there is shown one embodiment of the circuit for operating any of the key members in the keyboard 20 in a shift mode. A switch contact 50 (FIG. 5A) of a first designated shift key is coupled over conductor 52 to an open collector OR gate 54 whose other input is connected to the row conductor $R_1$ and whose output is connected to the column conductor $C_1$. The switch contact 50 is also coupled over a second conductor 56 to an inverter 58 whose output is coupled to a second open collector OR gate 60 whose output is also connected to conductor $C_1$. The other input to the OR gate 60 is connected to the row conductor $R_2$. FIG. 5B shows a second shift key whose switch contact 62 (FIG. 3) is connected in a similar fashion as switch contact 50 described above with the outputs of open collector OR gates 64, 66 being connected to the column conductor $C_1$ with one of the inputs being connected to the row conductors $R_3$ and $R_4$ respectively. While the switch contacts of the shift keys of the present embodiment are shown connected to the same column conductor $C_1$, it is obvious that a switch contact can be connected to any column and row conductor and still perform in the manner described.

Each of the outputs of the OR gates 54 and 64 is normally in a high or one state, which in the present embodiment using $T^2L$ logic is +5 volts derived from an appropirte voltage source 68, while the output of OR gate 60 is normally the same level as the row conductor $R_2$. Upon the closing of switch contact 50 (FIG. 5A) as a result of the depression of its associated shift key, the voltage source 68 is grounded resulting in the conductor 52 going low, which, upon the generation of the strobe pulse 48 (FIG. 4) over conductor $R_1$, makes the output of the OR gate 54 low. This condition is seen by the encoder 22 as a key being depressed at the junction of $R_1$ and $C_1$ (FIG. 3), and the pulse 48 is accepted by the encoder 22 as the depression of a shift key at that position. Upon the opening of the switch contact 50, as a result of the release of the shift key, the output of OR gate 60 will be low at the time of receiving the strobe pulse 48 over the row conductor $R_2$ which output is accepted by the encoder 22 as the depression of a second shift key at the junction of $R_2$, $C_1$ of the switch matrix 42 (FIG. 3) as indicated by the dotted line 70. This second pulse is seen by the encoder 22 as the result of a depression of a second or virtual shift key located at that junction. Any key 26 (FIG. 2) on the keyboard 20 depressed between the depression and release of the shift key whose switch contacts are represented by the contact 50 (FIG. 5A) will have its multi-bit code changed by the processing unit 24 (FIG. 1) in accordance with the functional operation of the shift key actuated. This procedure is repeated with respect to the switch contact 62 (FIGS. 3 and 5B). Thus, the keyboard encodeer 22 sees a plurality of shift keys connected between each of the row conductors $R_1$-$R_n$ inclusive and the column conductor $C_1$.

Figure 6:
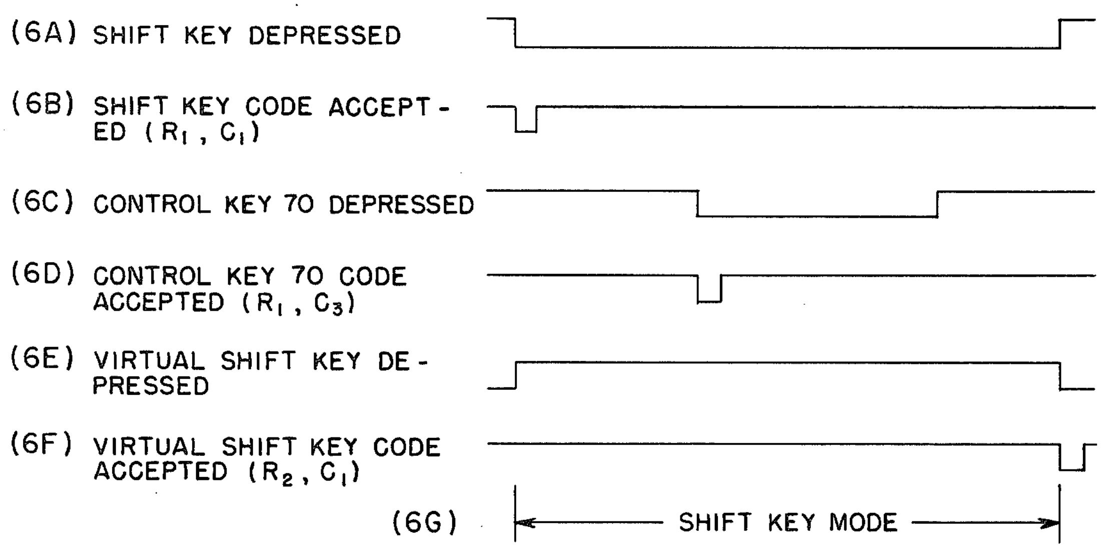
FIGS. 6(A through G) shows various waveforms illustrating the operation of the shift keys on the keyboard.
Figure 7:
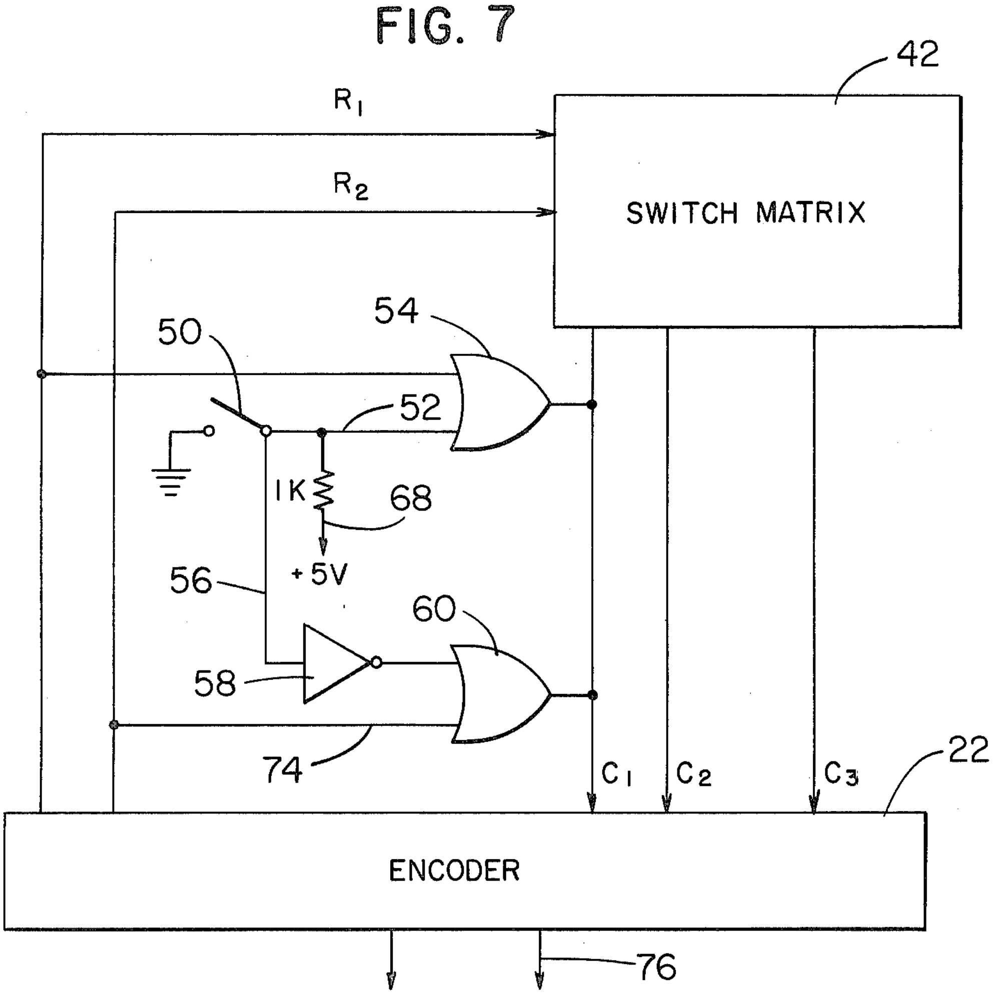
FIG. 7 is a schematic diagram of one embodiment of the shift circuit as applied to the present keyboard system.

Referring now to FIGS. 6 and 7, there is shown an embodiment of the shift key circuit (FIG. 7) together with a timing diagram (FIG. 6) of a shift key operation. As shown in FIG. 7, the column conductors $C_1$-$C_n$ of the switch matrix 42 are connected to the keyboard encoder 22. An example of a commercially available keyboard encoder that may be used in the present invention is that of American Micro-Systems, Inc., Encoder No. S9021, which is a 90 key encoder having full key rollover capabilities. Coupled from the encoder 22 to the switch matrix unit 42 are the row conductors $R_1$-$R_n$ inclusive which are driven by the strobe pulses 48 (FIG. 4) generated within the encoder 22. It is obvious that a separate pulse generator can be utilized to generate the strobe pulses 48 for scanning the conductors $R_1$-$R_n$ inclusive. The output of the OR gates 54, 60 are connected to the column conductor $C_1$ which is sensed by the encoder 22 for the output of row conductors $R_1$ and $R_2$ respectively, in the manner described previously.

As shown in FIG. 6, depression of one of the above mentioned shift mode keys 32-41 inclusive (FIG. 2) will result in the closing (FIG. 6A) of switch contact 50 (FIG. 7), which contact will remain closed (FIG. 6G) until the shift key is released. Closing of switch contact 50 will ground the voltage supply 68 thereby conditioning column conductor $C_1$ to be low at the time of a generation of a strobe pulse 48 over row conductor $R_1$ in the manner described previously. Sensing of the column conductor $C_1$ by the encoder 22 at this time will result in the encoder accepting (FIG. 6B) the shift key located at the junction of column conductor $C_1$ and the row conductor $R_1$. The closing of contact 50 will also condition the output of the OR gate 60 to go high, which conditions the encoder 22 through column conductor $C_1$ to receive a pulse transmitted over row conductor $R_2$ indicating that the shift key at location $R_2$, $C_1$ has been released. The encoder 22 will ignore this second shift key operation as the encoder accepts only true negative strobe pulses.

After the encoder 22 has accepted the depression of the shift key upon receiving the negative true pulse 48 (FIG. 4) transmitted over the row conductor $R_1$ and received over the column conductor $C_1$, the encoder 22 will then strobe the other row conductors for sensing the depression (FIG. 6C) of any of the control keys 26 (FIG. 2), which depression is accepted (FIG. 6D) in the same manner as that of the shift key as shown in FIG. 6B. Releasing of the depressed shift key results in the opening of the contact 50 (FIG. 7) thereby conditioning the OR gate 60 to transmit a true negative strobe pulse transmitted over the row conductor $R_2$ and which is transmitted to the OR gate 60 over conductor 74 (FIG. 7). This condition is sensed (FIG. 6E) by the encoder 22 over the column conductor $C_1$ which, as shown in FIG. 6F, is accepted by the encoder 22 as the depression of the second or virtual shift key. The generation of the signal representing the depression of the virtual shift key at the junction of row conductor $R_2$ and column conductor $C_1$ results in the outputting of encoded data over output data conductor 76 (FIG. 7) to the processing unit 24 informing the processing unit 24 the shift operation is ended. The processing unit 24 will then shift the data of as many control keys 26 (FIG. 2) as were depressed between the generation of the signal sensed at the junction $R_1$, $C_1$, and the junction $R_2$, $C_1$. It will thus be seen that by wiring any key member of the keyboard 20 in the manner just described, a shift key operation can be generated upon the depression and release of the wired key member.

Although the present invention has been fully described by way of example in connection with the preferred embodiment thereof, it is to be noted that various changes and modifications are apparent to those skilled in the art (for example, other logic gates such as tristate gates being substituted for OR gates 54, 60 to produce the same signal) and, therefore, the present invention is not to be limited unless otherwise departing from the spirit and scope of the invention as defined by the appended claims. What is claimed is:

1. In a keyboard encoding system of the type which is operated in response to the depression of a first key member representing a selected character for generating coded data representing the key depressed, a circuit operable upon the depression and release of a second key member for generating coded data for use in selecting a second character in response to the depression of the first key member comprising:

(a) means for generating a plurality of first signals;

(b) means for transmitting said first signals to said first and second key members for sensing the depression of said first and second key members;

(c) circuit means responsive to the depression and release of said second key member for generating a plurality of said first signals;

(d) and encoding means operable in response to the generation of said first signals and connected to said circuit means and said first key member for receiving said first signals upon depression of said first and second key members and said first signal upon release of said second key member, said encoding means outputting coded data representing the depression and release of said second key member for use in selecting a second character in response to the depression of said first key member.

2. The keyboard encoding system of claim 1 in which said transmitting means includes:

(a) a switch matrix including a plurality of input conductors, a plurality of output conductors, and diodes connected to each of said input conductors;

(b) switch means connected to said output conductors and said diodes and responsive to the depression of said first key member to enable an associated diode to be coupled to said output conductors, said generating means connected to said input conductors and said encoding means connected to said output conductors to receive said first signals over said output conductors in response to the depression of said first key member, said circuit means connected to one of said input conductors and one of said output conductors for outputting to said output conductor one of said first signals upon the closing of said switch means responsive to the depression of said second key member and another of said first signals upon the opening of said switch means responsive to the release of said second key member.

3. The keyboard encoding system of claim 2 in which said circuit means includes means coupled to said switch means and responsive to the depression of said second key member for inverting said first signal to produce a second signal upon depression of said second key member and said first signal upon release of said second key member.

4. The keyboard encoding system of claim 3 in which said circuit means further includes first gate means responsive to the depression of said second key member for gating said first signal from the input conductor to the output conductor during the depression of said second key member.

5. The keyboard encoding system of claim 4 in which said circuit means further includes second gate means connected to said inverting means and responsive to the release of said second key member for gating said first signal from the inverting means to the output conductor.

6. A keyboard encoding system for generating encoded data for use in generating a character representing the depression of a key in the keyboard comprising:

(a) a keyboard assembly having a plurality of first key members each representing a character, and a plurality of second key members;

(b) a switch matrix including a plurality of input and output conductors;

(c) switch means associated with each of said first and second key members and closed upon depression of its associated key member, each of said switch means associated with said first key members coupling one of said input conductors to certain ones of said output conductors upon closing thereof;

(d) means for generating a plurality of first signals for sampling each of said input conductors in succession to determine the open-closed state of the key switch means in said input conductors;

(e) circuit means coupled to said sampling means, to the switch means of said second key member, and to one of said output conductors for generating a plurality of first signals over a coupled output conductor upon depression and release of said second key member;

(f) and encoding means coupled to said output conductors and operable in response to receiving said first signals indicating the depression of said first key member and the depression and release of said second key member to output encoded signals for use in selecting a second character represented by the depression of said first key member.

7. The encoding system of claim 6 in which said circuit means includes:

(a) first gating means coupled to the switch means of said second key member, to said first generating means and to one of said output conductors for gating said first signals to the output conductor upon depression of said second key member;

(b) and logic means including a second gating means coupled to the switch means of said second key member, to said first generating means and to said one of said output conductors for gating said first signal upon release of said second key member to said one of said output conductor whereby the encoding means will output encoded data for use in selecting a second character represented by the depression of said first key member.

8. The encoding system of claim 7 in which said logic means further includes an inverter circuit coupled to the switch means of said second key member and said second gating means for enabling said second gating means to gate a first signal to said output conductor upon release of said second key member.

9. The encoding system of claim 8 in which said circuit means further includes a voltage source coupled to the switch means of said second key member, to said first gating means and to said inverter circuit for enabling said first gating means to gate said first signals to the output conductor upon depression of said second key member and to enable said inverter circuit to output to said second gating means said first signal upon release of said second key member.

10. A full key rollover keyboard encoding system of the type which is operated in response to the successive depression of key members each representing a selected character for generating encoded data representing the depression of one of said keys, each character which may be selected by said keyboard being designatable by its row and column position in a code matrix, comprising:

(a) a first key member representing a first character and a second character;

(b) a second key member;

(c) first means responsive to the depression of said first key member for generating a first signal representing the row position and column position of the depressed first key member;

(d) second means responsive to said first signal for generating encoded data representing the first key member for use in obtaining the first character represented by said first key member;

(e) and circuit means responsive to the depression and release of said second key member for generating a pair of first signals representing the row and column position of the second key member;

(f) said second generating means further responsive to said pair of first signals for generating encoded data representing the depression and release of said second key member for use in selecting the second character represented by said first key member.

11. The keyboard encoding system of claim 10 in which said first generating means includes a source of first signals connected to said first and second key members, said circuit means coupled to said source of said first signals and said second key member for generating said pair of first signals upon the depression and release of said second key member.

12. The keyboard encoding system of claim 11 in which said circuit means includes:

(a) first gating means coupled to said second key member and said source of said first signals for gating said first signals to said second generating means upon depression of said second key member;

(b) and logic means including a second gating means coupled to said second key member and said source of said first signals for gating said first signals to said second generating means upon release of said second key member.

13. The keyboard encoding system of claim 12 in which said logic means further includes an inverter circuit coupled to said second key member and said second gating means for enabling said second gating means to gate a first signal from said source of said first signals to said second generating means upon release of said second key member.

14. The keyboard system of claim 13 in which said circuit means further includes a voltage source coupled to said second key member, to said first gating means and to said first inverter circuit for enabling said first gating means to gate said first signals to said second generating means and to disable said second gating means from gating said first signals to said second generating means upon depression of said second key member and to disable said first gating means and enable said second gating means to gate said first signals to said second generating means upon the release of said second key member.

* * * * *